(No Model.)
H. VELLENOWETH.
FILTER AND CONNECTION WITH FAUCETS OR WATER SUPPLY.
No. 553,273. Patented Jan. 21, 1896.
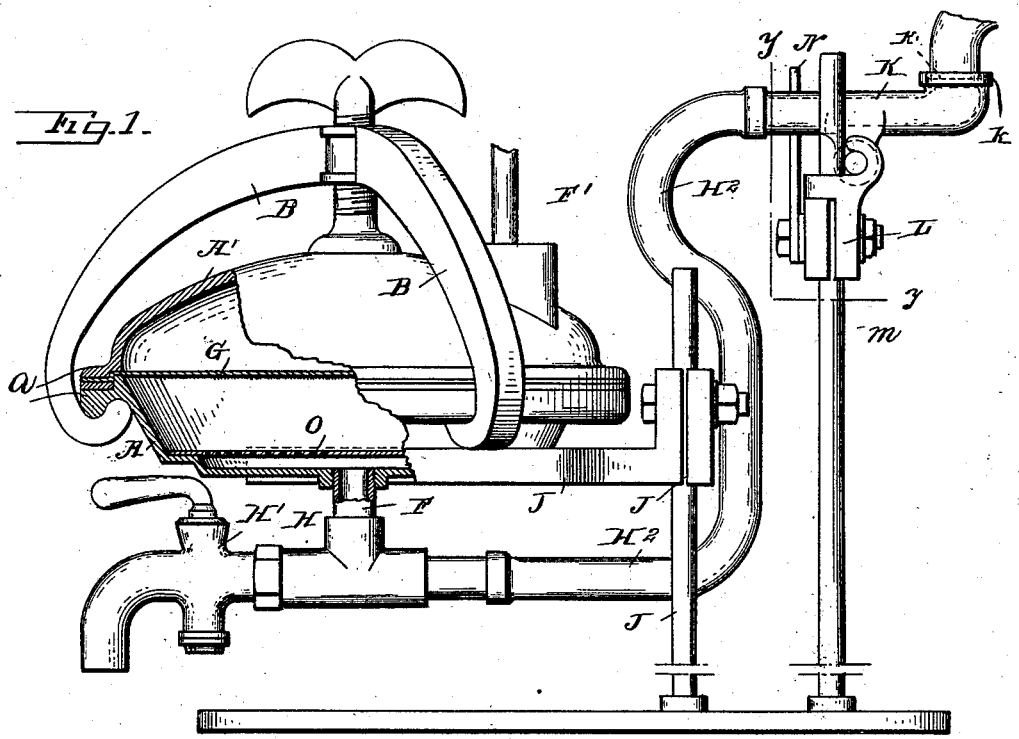
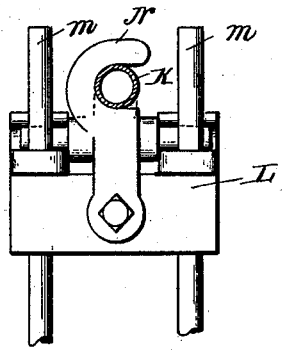
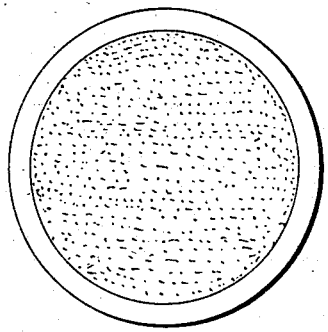
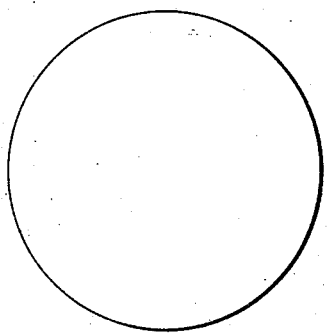
Witnesses.
Jesse B. Heller
Frank S. Busser
Inventor.
Harry Vellenoweth
by G. T. Harding
Attorney.

UNITED STATES PATENT OFFICE.

HARRY VELLENOWETH, OF PHILADELPHIA, PENNSYLVANIA.

FILTER AND CONNECTION WITH FAUCET OR WATER-SUPPLY.

SPECIFICATION forming part of Letters Patent No. 553,273, dated January 21, 1896.

Application filed October 22, 1894. Serial No. 526,586. (No model.)

*To all whom it may concern:*

Be it known that I, HARRY VELLENOWETH, a citizen of the United States, residing at Philadelphia, county of Philadelphia, and State of Pennsylvania, have invented a new and useful Improvement in Filters and Connection with Faucets or Water-Supplies, of which the following is a full, clear, and exact description, reference being had to the accompanying drawings, which form a part of this specification.

My invention relates to certain improvements in the filtering material and in the connection of the filter with the supply-pipe.

I will first describe my improvement as illustrated in the drawings, and then particularly point out my invention in the claims.

In the drawings, Figure 1 is a side elevation, partially in section, of a filtering apparatus embodying my invention. Fig. 2 is a section on line $y\,y$, Fig. 1. Fig. 3 is a plan view of one side of filtering-cloth. Fig. 4 is a plan view of other side of filtering-cloth. Fig. 5 is a plan view of modified form of apparatus.

A A' is the filtering-vessel, the part A being the filter, and the part A' the top. Both parts have corresponding flanges $a$, and the two parts are secured together at these flanged portions by means of the pronged arms B. In the lower portion A and opening therein is the pipe F for the incoming water to be filtered, and in the top of portion A' is the pipe F' for the discharge of the filtered liquid. Between the portions A and A', and extending across the entire body, is the filtering fabric G. This filtering fabric is of novel construction and consists of a fabric of fine mesh—such, for instance, as canvas. Upon one side of this fabric is applied finely-divided material in the form of a paint, paste, or cement. The material may be white ash, charcoal, or any other filtering material. The material is moistened sufficiently and applied to one side of this fabric. The mesh of this fabric must be of fineness sufficient to prevent the passage of the material applied to it. Secured to pipe F, and into which said pipe F opens, is the pipe H, having upon it beyond the pipe F the cock H'.

The filter A A', with its appurtenances, is supported by the stand J. The pipe H is connected by a rubber or other flexible hose $H^2$ with the pipe K, the pipe K terminating in the cap $k$. The pipe K is pivotally connected to the supporting-frame L, which is adapted to slide upon the vertical rods $m\,m$ of the stand M, and is provided with means to fix the position of the frame L upon the rods $m\,m$. N is a hook-lock pivoted to the frame L, and the hook being adapted to support the pipe K when in a fixed position. To couple the pipe K to the source of liquid supply, the frame L is moved upon the rods $m\,m$ to a proper position in relation to the faucet or source of supply, and the pipe K is rocked in its pivoted support until the washer $k'$ of a cap is forced into connection with the pipe from the source of supply, and it is locked in that position by the hook-lock N. The water then passes through pipe K, hose $H^2$, pipes H and F, into the following apparatus: Over the entrance of pipe F is a deflecting-plate O provided with perforations which distribute the incoming water, which then passes through the filtering fabric, by which it is purified, and passes out through the pipe F'. The cock H' when turned open will carry off the water and material in the filter through pipe H. When the filtering fabric G becomes clogged and filled with material which it has filtered from the water, it is removed and replaced by a new fabric.

I do not intend to limit myself to the specific devices shown in the drawings and described in the above specification, except so far as the same may be specifically claimed in the claims; but

What I claim, and desire to protect by Letters Patent, is—

1. The combination with a filtering apparatus provided with inlet and outlet pipes, of a pipe leading from the source of supply, a pipe provided with a cap adapted to fit against the supply pipe, a support for the capped pipe, the last-named pipe being adapted to rock upon its support, means to secure the last-named pipe in a fixed position, and a pipe connecting the last-named pipe and the inlet pipe to filter.

2. The combination with a filtering apparatus provided with inlet and outlet pipes, of a pipe leading from the source of supply, a pipe provided with a cap adapted to fit against the supply pipe, a frame to which the capped pipe is pivotally secured, rods upon which said frame is adapted to slide, means to secure the last-named pipe in a fixed position, and flexible connection between the last-named pipe and the inlet pipe to filter.

3. The combination with a filtering apparatus provided with inlet and outlet pipes, of a pipe leading from the source of supply, a pipe provided with a cap adapted to fit against the supply pipe, a frame to which the capped pipe is pivotally secured, rods upon which said frame is adapted to slide, a hook pivotally secured to said frame and adapted to hold the last-named pipe in a fixed position, and flexible connection between the last-named pipe and the inlet pipe to filter.

4. The combination with a filtering apparatus provided with inlet and outlet pipes, of a pipe leading from the source of supply, a pipe provided with a cap adapted to fit against the supply pipe, a frame to which the capped pipe is pivotally secured, a support for the frame upon which the frame is adapted to slide vertically, means attached to the sliding frame to hold the last-named pipe in a fixed position, and a pipe connecting the last-named pipe and the inlet pipe to filter.

In testimony of which invention I have hereunto set my hand.

HARRY VELLENOWETH.

Witnesses:
FRANK S. BUSSER,
PHILIP BOUTELJE.